United States Patent
Katsuura et al.

(10) Patent No.: US 11,555,459 B2
(45) Date of Patent: Jan. 17, 2023

(54) CONTROL DEVICE FOR INTERNAL COMBUSTION ENGINE

(71) Applicant: HONDA MOTOR CO., LTD., Tokyo (JP)

(72) Inventors: Akihiro Katsuura, Saitama-ken (JP); Yuki Yamada, Saitama-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/568,238

(22) Filed: Jan. 4, 2022

(65) Prior Publication Data
US 2022/0235720 A1 Jul. 28, 2022

(30) Foreign Application Priority Data
Jan. 28, 2021 (JP) .............................. JP2021-011655

(51) Int. Cl.
*F02D 41/00* (2006.01)
*F02P 5/152* (2006.01)
*F02D 35/02* (2006.01)

(52) U.S. Cl.
CPC ....... *F02D 41/0062* (2013.01); *F02D 35/025* (2013.01); *F02D 41/0052* (2013.01); *F02D 41/0072* (2013.01); *F02P 5/1522* (2013.01); *F02D 2200/0406* (2013.01); *F02D 2200/0414* (2013.01); *F02D 2200/101* (2013.01)

(58) Field of Classification Search
CPC ............. F02D 41/0062; F02D 41/0052; F02D 41/0072; F02D 35/025; F02D 2200/0406; F02D 2200/0414; F02D 2200/101; F02P 5/1522
USPC ........ 123/672, 435, 568.19, 568.2; 701/108; 73/114.74, 114.33
See application file for complete search history.

(56) References Cited

FOREIGN PATENT DOCUMENTS

JP 6174264 B2 8/2017

*Primary Examiner* — Hai H Huynh
(74) *Attorney, Agent, or Firm* — Carter, DeLuca & Farrell LLP

(57) ABSTRACT

In a control device for an internal combustion engine in which internal EGR and external EGR are conducted, an ideal in-cylinder gas amount and an ideal in-cylinder gas temperature in an ideal state in which neither of EGR gas recirculates into a cylinder are calculated (steps 1 and 2). A mixed gas amount of intake air and the external EGR gas present on a downstream side of a throttle valve is calculated, based on a rotation speed of the internal combustion engine and intake air pressure (step 21) to detect a mixed gas temperature. An actual in-cylinder gas temperature and amount and an EGR ratio are calculated, based on the ideal in-cylinder gas amount, the ideal in-cylinder gas temperature, the mixed gas amount, and the mixed gas temperature (steps 24, 4, and 5), and an internal combustion engine is controlled based on the EGR ratio.

4 Claims, 13 Drawing Sheets

CONTROL DEVICE FOR INTERNAL COMBUSTION ENGINE

BACKGROUND

Technical Field

The present invention relates to a control device for an internal combustion engine, and more particularly to a control device for an internal combustion engine for calculating an EGR ratio representing a ratio of EGR gas contained in gas charged in a cylinder and conducting control based on the EGR ratio that has been calculated.

Related Art

As a control device of this type, for example, the control device disclosed in JP 6174264 B2 by the present applicant has been conventionally known. In such a control device, the amount and the temperature of in-cylinder gas charged in a cylinder in an ideal state in which it is assumed that the exhaust gas of the internal combustion engine does not recirculate into the cylinder (EGR amount=0) are respectively calculated as an ideal in-cylinder gas amount Gth and a reference in-cylinder gas temperature Tcylstd. In addition, from an equilibrium relationship of the temperature in the cylinder, a temperature Tcyl of the in-cylinder gas actually charged in the cylinder is calculated by the following equation (A) using an intake air temperature Ta, an exhaust gas temperature Tex (internal EGR temperature), an external EGR temperature Tegr, an intake air amount Gaircyl, an internal EGR amount Ginegr, and an external EGR amount Gexegr.

$$Tcyl=(Ta \times Gaircyl + Tex \times Ginegr + Tegr \times Gexegr)/(Gaircyl + Ginegr + Gexegr) \ldots \quad (A)$$

Among the parameters of the equation (A), the external EGR amount Gexegr is calculated by applying an opening degree of an EGR control valve provided in an EGR passage and pressures on an upstream side and a downstream side thereof to an equation of a nozzle. In addition, the external EGR temperature Tegr is calculated by adding a temperature rise amount DTegr, which is caused by conducting the external EGR and which has been calculated in accordance with the external EGR amount Gexegr or the like, to the intake air temperature Ta that has been detected. Then, from gas state equations in an ideal state and in an actual filling state, an actual in-cylinder gas amount Gact is calculated, based on the ideal in-cylinder gas amount Gth that has been calculated as described above, the reference in-cylinder gas temperature Tcylstd, and the in-cylinder gas temperature Tcyl.

In addition, an EGR ratio REGRT, which is a ratio of internal and external EGR amounts with respect to the in-cylinder gas amount, is calculated, based on the in-cylinder gas amount Gact and the intake air amount Gaircyl. Furthermore, an optimum ignition timing and a knock limit ignition timing are calculated for controlling the internal combustion engine regarding the ignition timing, by using the in-cylinder gas temperature Tcyl and the EGR ratio REGRT that have been calculated.

SUMMARY

In the above control device, as illustrated in the equation (A), the in-cylinder gas temperature is calculated using the respective amounts and temperatures of the intake air, the internal EGR gas, and external EGR gas. Among these parameters, the external EGR amount is calculated by applying the equation of the nozzle to the EGR control valve, and the external EGR temperature is calculated by adding the temperature rise amount caused by the external EGR to the intake air temperature. However, the external EGR recirculates through a comparatively long EGR passage from an exhaust passage side to an intake passage side, a transport delay until the external EGR reaches the intake passage is large. For this reason, even in a case where the external EGR amount and the external EGR temperature can be accurately calculated by the above method, an influence of the transport delay will cause deviation from the calculation results in a state in which the cylinder is actually filled. The influence of such a transport delay is particularly noticeable during a transient operation of the internal combustion engine. As a result, the in-cylinder gas temperature using the external EGR amount and the external EGR temperature cannot be accurately calculated. This leads to a reduction in calculation accuracy of the EGR ratio, and besides, control of the internal combustion engine for the ignition timing using the in-cylinder gas temperature and the EGR ratio cannot be appropriately conducted.

The present invention has been made to address the above issues, and has an object to provide a control device for an internal combustion engine, in a case where external EGR is conducted together with internal EGR, the control device being capable of accurately calculating a temperature and an amount of in-cylinder gas charged in a cylinder and an EGR ratio while suppressing an influence of a transport delay of the external EGR, and appropriately controlling the internal combustion engine using the EGR ratio that has been calculated.

In order to achieve such an object, according to a first aspect of the present invention, a control device is provided for an internal combustion engine, which sucks air into a cylinder through a throttle valve 7 provided in an intake passage (intake pipe 4 in an embodiment (hereinafter, the same applies in the present paragraph)), and in which internal EGR and external EGR are conducted, the internal EGR recirculating exhaust gas of the internal combustion engine 1 into the cylinder as internal EGR gas, the exhaust gas having flown back from an exhaust passage (exhaust pipe 5) side to an intake passage side due to an overlap between an intake valve and an exhaust valve, the external EGR partially recirculating the exhaust gas to the intake passage as external EGR gas, the exhaust gas having been discharged from the cylinder to the exhaust passage, the control device including: an ideal in-cylinder gas amount calculation unit (ECU 2, step 1) configured to calculate, as an ideal in-cylinder gas amount Gth, an in-cylinder gas amount charged in the cylinder in an ideal state in which it is assumed that neither the internal EGR gas nor the external EGR gas recirculates into the cylinder; an ideal in-cylinder gas temperature calculation unit (ECU 2, step 2) configured to calculate, as an ideal in-cylinder gas temperature Tcylth, an in-cylinder gas temperature in the ideal state; a rotation speed detection unit (crank angle sensor 27) configured to detect a rotation speed NE of the internal combustion engine; an intake air pressure detection unit (intake air pressure sensor 24) configured to detect, as intake air pressure PBA, pressure on a downstream side of the throttle valve 7 in the intake passage; a mixed gas amount calculation unit (ECU 2, step 21) configured to calculate a mixed gas amount of intake air and the external EGR gas (SD-method intake air amount GAIRCYLSD) present on a downstream side of the throttle valve 7 of the intake passage and charged in the cylinder, based on the rotation speed NE of the internal combustion engine and the intake air pressure PBA; a mixed gas temperature detection unit (intake manifold temperature sensor 25) configured to detect a mixed gas temperature (intake manifold temperature Tain); an internal EGR temperature acquisition unit (ECU 2, step 22) configured to acquire an internal EGR temperature (exhaust gas temperature Tex); an internal EGR amount calculation unit (ECU 2, step 23) configured to calculate an internal EGR amount Ginegr, based on the ideal in-cylinder gas amount Gth, the ideal in-cylinder gas temperature Tcylth, the mixed gas amount, the mixed gas temperature, and the internal EGR temperature; an in-cylinder gas temperature calculation unit (ECU 2, step 24) configured to calculate a temperature Tcyl of the in-cylinder gas actually charged in the cylinder, based on the ideal in-cylinder gas amount Gth, the ideal in-cylinder gas temperature Tcylth, the mixed gas temperature, the internal EGR temperature, and the internal EGR amount Ginegr; an in-cylinder gas amount calculation unit (ECU 2, step 4) configured to calculate an in-cylinder gas amount Gact, based on the ideal in-cylinder gas amount Gth, the ideal in-cylinder gas temperature Tcylth, and the in-cylinder gas temperature Tcyl; an intake air amount detection unit (intake air amount sensor 22) configured to detect an intake air amount Gaircyl to be sucked into the cylinder; an EGR ratio calculation unit (ECU 2, step 5) configured to calculate an EGR ratio REGRT that is a ratio of an EGR amount obtained by combining the internal EGR amount and the external EGR amount with respect to the in-cylinder gas amount Gact (Gact−Gaircyl), based on the in-cylinder gas amount Gact and the intake air amount Gaircyl; and a control unit (ECU 2, FIG. 7) configured to control the internal combustion engine 1, based on the EGR ratio REGRT.

According to this configuration, the amount of the in-cylinder gas charged in the cylinder in an ideal state in which it is assumed that neither the internal EGR gas nor the external EGR gas recirculates into the cylinder is calculated as an ideal in-cylinder gas amount, and the temperature of the in-cylinder gas in the ideal state is calculated as an ideal in-cylinder gas temperature. In addition, the amount of the mixed gas of the intake air and the external EGR gas present on the downstream side of the throttle valve of the intake passage is calculated by, for example, a speed-density method based on the rotation speed of the internal combustion engine and the intake air pressure (pressure on the downstream side of the throttle valve in the intake passage) that have been detected. In addition, the temperature of the mixed gas is detected. As described above, the mixed gas is present on the downstream side of the throttle valve of the intake passage in a state in which the intake air and the external EGR gas are mixed together. Thus, the amount and the temperature of the mixed gas calculated or detected as described above are hardly influenced by a transport delay, and favorably reflect an actual state in which the cylinder is filled, unlike the case of handling the external EGR gas solely.

In addition, according to the present invention, the internal EGR amount is calculated, based on the ideal in-cylinder gas amount, the ideal in-cylinder gas temperature, the mixed gas amount, the mixed gas temperature, and the internal EGR temperature that has been detected. Further, the temperature of the in-cylinder gas actually charged in the cylinder is calculated, based on the ideal in-cylinder gas amount, the ideal in-cylinder gas temperature, the mixed gas temperature, the internal EGR temperature, and the internal EGR amount. These are because of the following reasons.

First, in a case where an ideal state in which neither the internal EGR gas nor the external EGR gas recirculates and only the intake air is charged in the cylinder and an actual state in which the internal EGR gas and the external EGR gas are charged together with the intake air are compared with each other under an identical condition of the intake air pressure, the following equation (B) is established between the ideal in-cylinder gas and the actual in-cylinder gas, because the pressure (intake air pressure) and the volume (cylinder volume) in the gas state equation are the same.

$$\text{Ideal in-cylinder gas amount} \times \text{ideal in-cylinder gas temperature} = \text{in-cylinder gas amount} \times \text{in-cylinder gas temperature} \ldots \quad (B)$$

In addition, in the above actual state, the following equation (C) is established from the equilibrium relationship of the temperature in the cylinder.

$$\text{In-cylinder gas amount} \times \text{in-cylinder gas temperature} = \text{internal EGR amount} \times \text{internal EGR temperature} + \text{intake air amount} \times \text{intake air temperature} + \text{external EGR amount} \times \text{external EGR temperature} = \text{internal EGR amount} \times \text{internal EGR temperature} + \text{mixed gas amount} \times \text{mixed gas temperature} \ldots \quad (C)$$

From these equations (B) and (C), the internal EGR amount is calculated, based on the above five parameters (the ideal in-cylinder gas amount, the ideal in-cylinder gas temperature, the mixed gas amount, the mixed gas temperature, and the internal EGR temperature). Similarly, from the equations (B) and (C), the actual in-cylinder gas temperature is calculated, based on the above five parameters (the ideal in-cylinder gas amount, the ideal in-cylinder gas temperature, the mixed gas temperature, the internal EGR temperature, and the internal EGR amount). In addition, instead of the amount and the temperature of the external EGR, the mixed gas amount and the mixed gas temperature each having almost no influence of a transport delay are used for calculating the internal EGR amount and the in-cylinder gas temperature. Therefore, it is possible to accurately calculate the internal EGR amount and the in-cylinder gas temperature.

Furthermore, according to the present invention, the actual in-cylinder gas amount is calculated from the equation (B), based on the ideal in-cylinder gas amount, the ideal in-cylinder gas temperature, and the in-cylinder gas temperature. In addition, the EGR ratio, which is a ratio of the EGR amount obtained by adding the internal EGR amount and the external EGR amount with respect to the in-cylinder gas amount, is calculated, based on the in-cylinder gas amount and the intake air amount that has been detected. As described above, when the external EGR is conducted together with the internal EGR, it is possible to accurately calculate the in-cylinder gas temperature and the in-cylinder gas amount to be charged in the cylinder and the EGR ratio, while suppressing an influence of the transport delay of the external EGR. In addition, it is possible to appropriately control the internal combustion engine using such a highly accurate EGR ratio.

According to a second aspect of the present invention, in the control device for the internal combustion engine described in the first aspect, the internal combustion engine 1 includes a valve operation characteristic variable device 3 configured to change operation phases (intake phase CAIN, exhaust phase CAEX) of the intake valve and the exhaust valve to change the internal EGR amount, the control device further includes: a storage unit (ECU 2) configured to store a relationship among the rotation speed NE of the internal combustion engine, the operation phases of the intake valve and the exhaust valve, the ideal in-cylinder gas amount Gth, and the ideal in-cylinder gas temperature Tcylth; and an operation phase acquisition unit (intake cam angle sensor 28 and exhaust cam angle sensor 29) configured to acquire the operation phases of the intake valve and the exhaust valve, and the ideal in-cylinder gas amount calculation unit calculates the ideal in-cylinder gas amount Gth, and the ideal in-cylinder gas temperature calculation unit calculates the ideal in-cylinder gas temperature Tcylth, based on the relationship that has been stored in the storage unit, in accordance with the rotation speed NE of the internal combustion engine that has been detected and the operation phases of the intake valve and the exhaust valve that have been acquired.

In this configuration, the valve operation characteristic variable device changes the operation phases of the intake valve and the exhaust valve to change the internal EGR amount. According to the present invention, the relationship among the rotation speed of the internal combustion engine, the operation phase of the intake valve, the operation phase of the exhaust valve, and the ideal in-cylinder gas amount, and the relationship among the above three parameters and the ideal in-cylinder gas temperature are stored in the storage unit. The ideal state is a comparatively simple state in which neither the internal EGR gas nor the external EGR gas recirculates into the cylinder and only the intake air is charged. Therefore, the ideal in-cylinder gas amount and the ideal in-cylinder gas temperature in this state can be easily and accurately set in accordance with the above three parameters.

Further, according to the present invention, the ideal in-cylinder gas amount is calculated, based on the relationship that has been stored, in accordance with the rotation speed of the internal combustion engine that has been detected during the operation of the internal combustion engine and the operation phases of the intake valve and the exhaust valve that have been acquired. Therefore, it is possible to easily and accurately carry out the calculation. Similarly, the ideal in-cylinder gas temperature is calculated, based on the relationship that has been stored, in accordance with the above three parameters. Therefore, it is possible to easily and accurately carry out the calculation.

According to a third aspect of the present invention, in the control device for the internal combustion engine described in the first or second aspect, the control unit further includes: a basic value calculation unit (ECU 2, step 41) configured to calculate a basic value IGKNOCKB of a knock limit ignition timing corresponding to an occurrence limit of knocking in the internal combustion engine; an EGR knocking correction amount calculation unit (ECU2, step 43) configured to calculate an EGR knocking correction amount DEGRT in accordance with the EGR ratio REGRT; a temperature knocking correction amount calculation unit (ECU 2, steps 42, 52) configured to calculate a temperature knocking correction amount DIGTIC in accordance with a difference between the ideal in-cylinder gas temperature Tcylth and the in-cylinder gas temperature Tcyl; and a knock limit ignition timing calculation unit (ECU 2, step 45) configured to correct the basic value IGKNOCKB by using the EGR knocking correction amount DEGRT and the temperature knocking correction amount DIGTIC to calculate the knock limit ignition timing IGKNOCK, and the control unit controls an ignition timing IGLOG by using the knock limit ignition timing IGKNOCK (steps 34 and 36).

According to this configuration, the basic value of the knock limit ignition timing corresponding to an occurrence limit of knocking is calculated, the EGR knocking correction amount is calculated in accordance with the EGR ratio, as a correction amount for correcting the basic value, and the temperature knocking correction amount is calculated in accordance with a difference between the ideal in-cylinder gas temperature and the in-cylinder gas temperature. The correlation between the knock limit ignition timing and the EGR ratio is high, and knocking is more likely to occur, as the actual in-cylinder gas temperature is higher. Therefore, by correcting the basic value with the EGR knocking correction amount and the temperature knocking correction amount that have been calculated as described above, it is possible to appropriately calculate the knock limit ignition timing in accordance with the EGR ratio and the in-cylinder gas temperature. In addition, it is possible to appropriately control the ignition timing using the knock limit ignition timing that has been calculated.

According to a fourth aspect of the present invention, in the control device for the internal combustion engine described in the third aspect, the control unit further includes an optimum ignition timing calculation unit (ECU 2, step 31, FIG. 14) configured to calculate an optimum ignition timing IGMBT at which an output of the internal combustion engine is maximized in accordance with the EGR ratio REGRT, and the control unit controls the ignition timing IGLOG by using the ignition timing on a retarded angle side of either the knock limit ignition timing IGKNOCK or the optimum ignition timing IGMBT (steps 33 to 36).

According to this configuration, the optimum ignition timing is calculated in accordance with the EGR ratio. The ignition delay and the combustion speed change when the EGR ratio changes. Thus, it has been confirmed that there is a close relationship between the EGR ratio and the optimum ignition timing. Therefore, it is possible to simply and accurately set the optimum ignition timing in accordance with the EGR ratio by the above calculation method. In addition, the ignition timing is controlled by using the ignition timing on a more retarded angle side of the optimum ignition timing and the knock limit ignition timing that have been set. Thus, the maximum output of the internal combustion engine is obtainable within a range in which the knocking can be reliably avoided.

DETAILED DESCRIPTION

Figure 1:
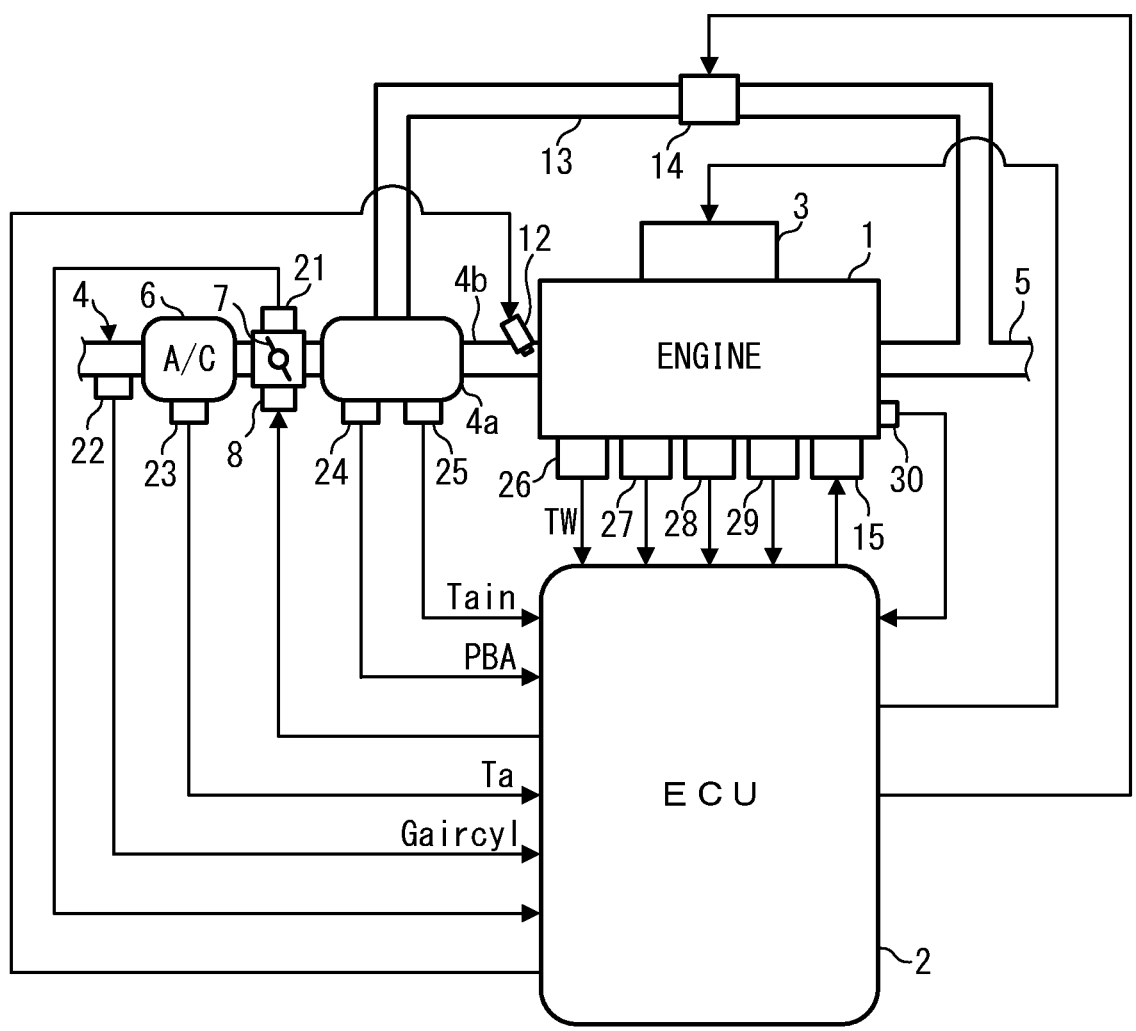
FIG. 1 is a diagram schematically illustrating a control device according to an embodiment of the present invention together with an internal combustion engine.

Hereinafter, preferred embodiments of the present invention will be described in detail with reference to the drawings. FIG. 1 schematically illustrates a control device according to an embodiment of the invention together with an internal combustion engine. The internal combustion engine (hereinafter referred to as "engine") 1 is, for example, a four-cylinder gasoline engine for a vehicle, and includes four sets of cylinders and pistons, an intake valve and an exhaust valve (neither of which is illustrated) provided for every cylinder, and a valve operation characteristic variable device 3 for changing operation phases of the intake valve and the exhaust valve.

The valve operation characteristic variable device 3 includes an intake cam phase variable mechanism (not illustrated) capable of changing a phase of an intake cam for driving the intake valve, and an exhaust cam phase variable mechanism (not illustrated) capable of changing a phase of an exhaust cam for driving the exhaust valve. The intake cam phase variable mechanism is configured to continuously change a relative phase of the intake cam with respect to a crankshaft (not illustrated) of an engine 1 to an advanced angle side or a retarded angle side, and thus changes an operation phase CAIN of the intake valve (hereinafter referred to as "intake phase"). Similarly, the exhaust cam phase variable mechanism is configured to continuously change the relative phase of the exhaust cam with respect to the crankshaft, and thus changes an operation phase CAEX of the exhaust valve (hereinafter referred to as "exhaust phase"). In addition, the valve operation characteristic variable device 3 also includes a valve lift variable mechanism capable of changing a valve lift (maximum lift) of the intake valve in two stages of large and small.

An intake pipe 4 (intake passage) and an exhaust pipe 5 (exhaust passage) are connected with the engine 1. The intake pipe 4 is provided with an air cleaner 6 and a throttle valve 7 sequentially from an upstream side, and is connected with each cylinder of the engine 1 via an intake manifold (inlet manifold) 4b including an intake chamber 4a on its downstream side. The throttle valve 7 is driven by an actuator 8 controlled by an ECU 2. In addition, the opening degree of the throttle valve 7 is detected by a throttle valve opening degree sensor 21, and a detection signal thereof is output to the ECU 2.

In addition, the intake pipe 4 is provided with an intake air amount sensor 22 on the upstream side of the air cleaner 6, and an intake air temperature sensor 23 on the air cleaner 6. These sensors 22 and 23 respectively detect an intake air amount Gaircyl and an intake air temperature (temperature of intake air) Ta, and output their detection signals to the ECU 2. The intake chamber 4a is further provided with an intake air pressure sensor 24 and an intake manifold temperature sensor 25. The intake air pressure sensor 24 detects intake air pressure PBA, which is pressure on the downstream side of the throttle valve 7. The intake manifold temperature sensor 25 detects a temperature of mixed gas (intake manifold gas) of intake air in the intake chamber 4a and external EGR gas to be described later, as an intake manifold gas temperature Tain. Their detection signals are output to the ECU 2.

In addition, a fuel injection valve 12 is provided for every cylinder in the intake manifold 4b of the intake pipe 4. Each fuel injection valve 12 is connected with a fuel pump (not illustrated), and a fuel injection amount and a fuel injection timing are controlled by a drive signal from the ECU 2.

An EGR pipe 13 is provided between the intake pipe 4 and the exhaust pipe 5 to recirculate a part of the exhaust gas, which has been discharged from the cylinder of the engine 1 to the exhaust pipe 5, into the intake pipe 4, as the external EGR gas. The EGR pipe 13 is connected with the intake chamber 4a. An EGR control valve 14 for adjusting the flow rate of the external EGR gas is provided partway on the EGR pipe 13. The opening degree of the EGR control valve 14 is controlled by a drive signal from the ECU 2, and thus an external EGR amount Gexegr is controlled.

The cylinder head of the engine 1 is provided with an ignition plug 15, which ignites an air-fuel mixture in a combustion chamber for every cylinder. The ignition timing of each ignition plug 15 is controlled by a drive signal from the ECU 2.

In addition, the engine 1 is provided with an engine water temperature sensor 26 that detects a temperature (engine water temperature) TW of the cooling water, a crank angle sensor 27 that detects a rotation angle of the crank shaft, and an intake cam angle sensor 28 and an exhaust cam angle sensor 29 that respectively detect rotation angles of the intake cam shaft and the exhaust cam shaft. Detection signals of these sensors 26 to 29 are output to the ECU 2.

The crank angle sensor 27 outputs a CRK signal and a TDC signal, which are pulse signals, to the ECU 2, as the crankshaft rotates. The CRK signal is output at every predetermined crank angle (for example, 1 degree). The ECU 2 calculates a rotation speed NE of the engine 1 (hereinafter, referred to as "engine speed") based on the CRK signal. The TDC signal is a signal representing that the piston is located at a predetermined crank angle position slightly before the top dead center at the start time of the intake stroke in any of the cylinders, and is output at every crank angle of 180 degrees in a case where the engine 1 includes four cylinders.

In addition, the ECU 2 calculates an intake air amount to be sucked into the cylinder from the intake manifold 4b in a speed-density method based on the engine speed NE and the intake air pressure PBA that has been detected by the intake air pressure sensor 24. Hereinafter, the intake air amount calculated in this manner is referred to as "SD-method intake air amount GAIRCYLSD".

In accordance with the rotation of the intake cam shaft onto which the intake cam is fixed, the intake cam angle sensor 28 outputs an intake CAM signal, which is a pulse signal, to the ECU 2 at every predetermined cam angle (for example, 1 degree). The ECU 2 calculates an intake phase CAIN based on the intake CAM signal and the CRK signal described above. On the other hand, in accordance with the rotation of the exhaust cam shaft onto which the exhaust cam is fixed, the exhaust cam angle sensor 29 outputs an exhaust CAM signal, which is a pulse signal, to the ECU 2 at every predetermined cam angle (for example, 1 degree). The ECU 2 calculates an exhaust phase CAEX based on the exhaust CAM signal and the CRK signal.

In addition, a knock sensor 30 that detects a high-frequency vibration is attached to the engine 1, and a detection signal thereof is output to the ECU 2.

Figure 2:
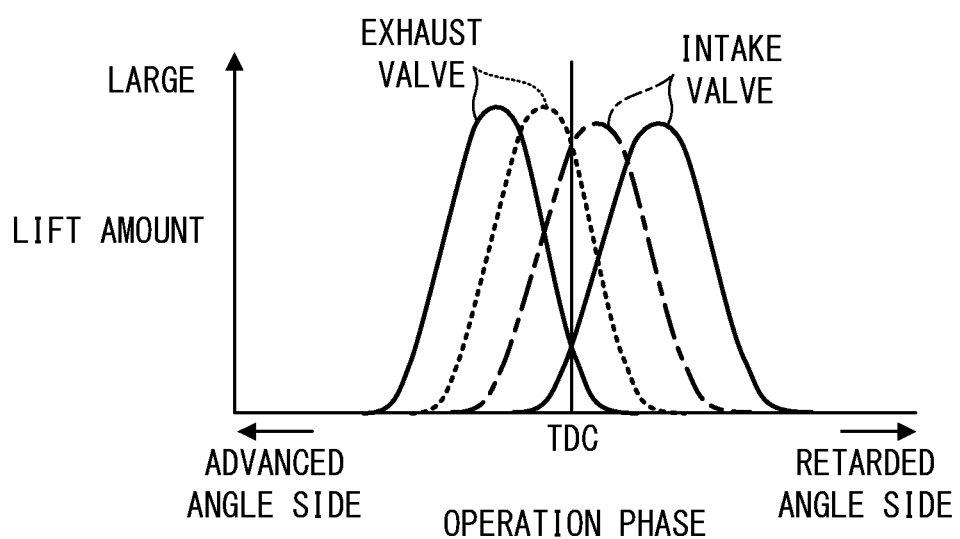
FIG. 2 is a lift curve indicating changes in valve timings of an intake valve and an exhaust valve.

Further, the intake cam phase variable mechanism of the valve operation characteristic variable device 3 changes the phase of the intake cam, and therefore changes the intake phase CAIN in a stepless manner between the phase of the most retarded angle indicated by one solid line and the phase of the most advanced angle indicated by a one-dot chain line in FIG. 2. In addition, although not illustrated, a valve lift variable mechanism changes the valve lift of the intake valve in two stages of large and small. Furthermore, the exhaust cam phase variable mechanism changes the phase of the exhaust cam, and therefore changes the exhaust phase CAEX in a stepless manner between the phase of the most advanced angle indicated by the other solid line and the phase of the most retarded angle indicated by a broken line in FIG. 2.

In addition, as illustrated in FIG. 2, an overlap in which the intake valve and the exhaust valve simultaneously open occurs near the top dead center (TDC). Accordingly, the exhaust gas that has been partially discharged to the exhaust pipe 5 flows back to the intake pipe 4 side, is sucked into the cylinder in the subsequent intake stroke, and recirculates. Thus, the internal EGR is obtained. Such an internal EGR amount is controlled by changing the intake phase CAIN and the exhaust phase CAEX, increases as the overlap is larger, that is, the intake phase CAIN is located on the advanced angle side, and increases as the exhaust phase CAEX is located on the retarded angle side. Thus, a comparatively large amount of the internal EGR is obtained.

The ECU 2 is configured with a microcomputer including a CPU, a RAM, a ROM, and an I/O interface (none of which is illustrated). The ECU 2 calculates the temperature and the amount (mass) of the in-cylinder gas actually charged in the cylinder, calculates the EGR ratio, and controls ignition timings, as will be described below, in accordance with the detection signals from the various sensors described above. Note that in the present embodiment, the ECU 2 corresponds to an ideal in-cylinder gas amount calculation unit, an ideal in-cylinder gas temperature calculation unit, a mixed gas amount calculation unit, an internal EGR temperature acquisition unit, an internal EGR amount calculation unit, an in-cylinder gas temperature calculation unit, an in-cylinder gas amount calculation unit, an EGR ratio calculation unit, a control unit, a storage unit, a basic value calculation unit, an EGR knocking correction amount calculation unit, a temperature knocking correction amount calculation unit, a knock limit ignition timing calculation unit, and an optimum ignition timing calculation unit.

Figure 3:
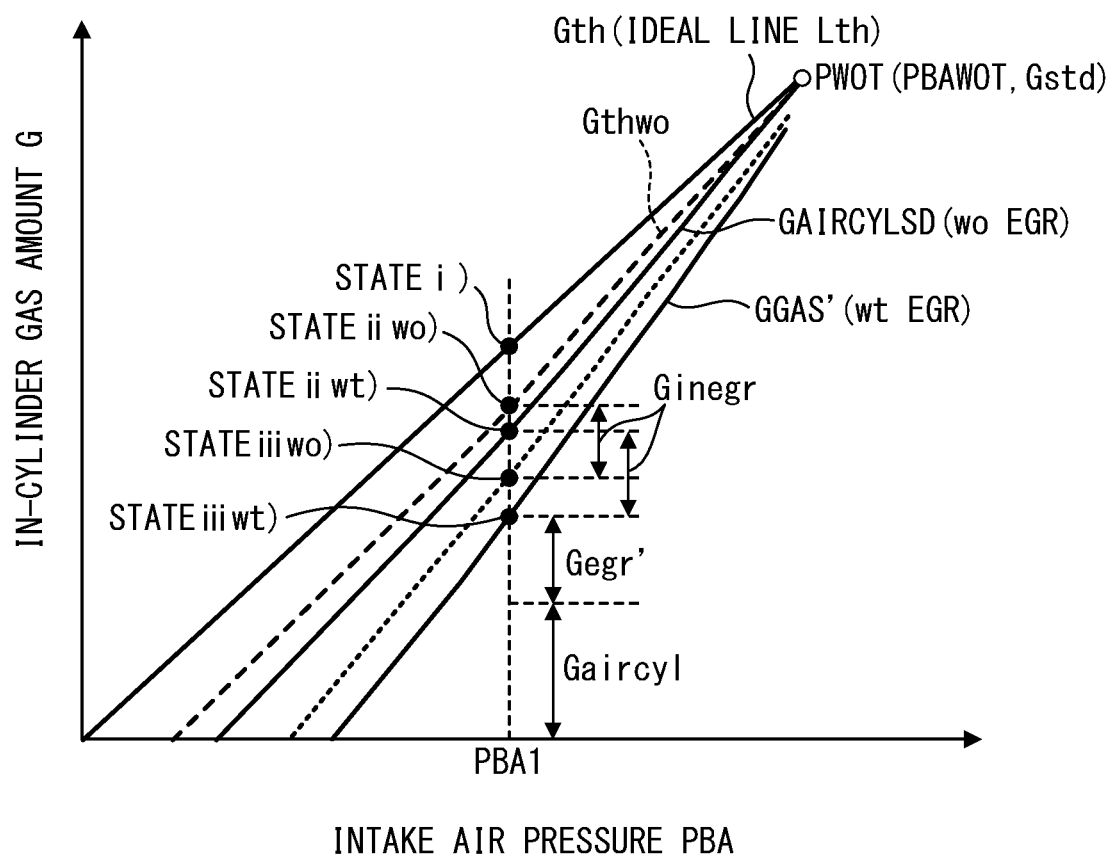
FIG. 3 is a diagram for describing a method for calculating an in-cylinder gas amount and an in-cylinder gas temperature.

Next, a method for calculating an in-cylinder gas amount Gact and an in-cylinder gas temperature Tcyl actually charged in the cylinder will be described with reference to FIG. 3. FIG. 3 illustrates a relationship between the intake air pressure PBA and the in-cylinder gas amount G in five states, when the intake air pressure PBA is a predetermined value PBA1, in a case where the engine speed NE is a predetermined constant value and the intake phase CAIN and the exhaust phase CAEX are respectively predetermined constant values.

First, a state i) is represented by an ideal line Lth passing through a reference point PWOT. At this reference point PWOT, the throttle valve 7 is in a fully open state, and the intake air pressure PBA is substantially equal to the atmospheric pressure. Hereinafter, the intake air pressure and the in-cylinder gas amount at the reference point PWOT are respectively referred to as reference intake air pressure PBAWOT and a reference in-cylinder gas amount Gstd. In addition, there is almost no pressure difference between the exhaust side and the intake side at the reference point PWOT. Therefore, even in a state in which the overlap between the intake valve and the exhaust valve occurs, the backflow of the exhaust gas from the exhaust side to the intake side does not occur, and the internal EGR amount generated by blowing back from the exhaust side becomes substantially zero.

For this reason, the ideal line Lth connecting the reference point PWOT and an origin O represents an ideal state in which it is assumed that the exhaust gas does not recirculate into the cylinder, that is, an ideal state in which it is assumed that the external EGR is not conducted and there is no internal EGR, and the in-cylinder gas temperature is regarded to be constant. Hereinafter, the in-cylinder gas amount on the ideal line Lth including the state i) is referred to as an ideal in-cylinder gas amount Gth, and the in-cylinder gas temperature is referred to as an ideal in-cylinder gas temperature Tcylth.

A state ii wo) corresponds to a state in which the ideal in-cylinder gas amount Gth in the above state i) is corrected by the actual in-cylinder gas temperature Tcylwo, in a state in which the external EGR is not being conducted (hereinafter, referred to as "external EGR non-performing state") (WO). Hereinafter, the ideal in-cylinder gas amount that has been corrected in this manner is referred to as a temperature-corrected in-cylinder gas amount Gthwo. The temperature-corrected in-cylinder gas amount Gthwo is equal to a sum of the internal EGR amount Ginegr and the intake air amount Gaircyl in the external EGR non-performing state.

A state ii wt) corresponds to a state in which the external EGR is being conducted (hereinafter referred to as "external EGR performing state") (WT), in contrast to the above state ii wo). Therefore, the in-cylinder gas amount in the state ii wt) is equal to a sum of the internal EGR amount Ginegr, the external EGR amount Gexegr, and the intake air amount Gaircyl. In addition, a state iii wo) and a state iii wt) respectively correspond to states in which the internal EGR is excluded from the state ii wo) and the state ii wt). Relationships among these five states will be described below.

First, the following equation (1) is established from gas state equations in the state i) and the state ii wo).

[MATH. 1]

Gth: ideal in-cylinder gas amount on ideal line Lth

Tcylth: ideal in-cylinder gas temperature on ideal line Lth

Gthwo: temperature-corrected in-cylinder gas amount by in-cylinder gas temperature Tcyl Tcylwo: in-cylinder gas temperature in external EGR non-performing state Note that the units of temperature parameters such as the ideal in-cylinder gas temperature Tcylth used in an embodiment are all expressed in absolute temperature (Kelvin).

In addition, in a case where Boyle Charles' law is applied to the state ii wo), the following equation (2) is obtained.

[MATH. 2]
Tain: intake manifold gas temperature
Gaircyl: intake air amount
Tex: exhaust gas temperature
Ginegr: internal EGR amount From a relationship between the state iii wo) and the state ii wo), Gaircyl+Ginegr in equation (2) is equal to the temperature-corrected in-cylinder gas amount Gthwo in equation (1). Therefore, equation (2) is rewritten into the following equation (3).
[MATH. 3]

Further, in a case where the left side of equation (3) is replaced with the left side of equation (1), the following equation (4) is established.
[MATH. 4]

The intake air amount Gaircyl in the state ii wo) is replaceable with the above-described SD-method intake air amount GAIRCYLSD, and therefore the following equation (5) is established in a case where equation (4) is rewritten and the internal EGR amount Ginegr is expressed.
[MATH. 5]
GAIRCYLSD: SD-method intake air amount In this manner, according to equation (5), as is apparent from comparison with the conventional calculation equation (A) described above, the internal EGR amount Ginegr is calculated using the intake manifold gas temperature Tain and the SD-method intake air amount GAIRCYLSD, instead of the intake air temperature Ta and the external EGR amount Gegr.

In addition, the in-cylinder gas temperature Tcyl in the state ii wt) is expressed by the following equation (6) from the Boyle Charles' law.
[MATH. 6]
Tcyl: in-cylinder gas temperature
Tex: exhaust gas temperature
Ta: intake air temperature
Tegr: external EGR temperature
Gegr': external EGR amount in the state ii wt)

The intake air temperature Ta and the external EGR temperature Tegr in equation (6) are detected as the intake manifold gas temperature Tain by the intake manifold temperature sensor 25, in a state in which the intake air and the external EGR gas are mixed together in the intake chamber 4a. Therefore, equation (6) is rewritten into the following equation (7).
[MATH. 7]

In addition, in a case where the gas amount in the state iii wt) is GGAS' (see FIG. 3), a relationship GGAS'=Gaircyl+Gegr' is established, and equation (7) is rewritten into the following equation (8).
[MATH. 8]

Furthermore, from the gas state equations in the state ii wo) and the state ii wt), a first expression of equation (9) is established, and a second expression of equation (9) is obtained by replacing (GAIRCYLSD+Ginegr)×Tcylwo in the first expression with a coefficient A, as in equation (10).
[MATH. 9]
[MATH. 10]

When the second expression in equation (9) is substituted into equation (8) and developed, the following equation (11) is obtained. Furthermore, when equation (11) is solved for the in-cylinder gas temperature Tcyl, equation (12) is established.
[MATH. 11]
[MATH. 12]

Moreover, the coefficient $A=Gth \times Tcylth$ is established from equations (1) and (10). By substituting this into equation (12), equation (13), which is a final calculation equation of the in-cylinder gas temperature Tcyl, is obtained.
[MATH. 13]

In addition, the following equation (14) is established from the gas state equations in the state i) and the state ii wt). Therefore, by substituting the in-cylinder gas temperature Tcyl that has been calculated by equation (13) into equation (14), the actual in-cylinder gas amount Gact in this situation is calculated.
[MATH. 14]

Further, by using the in-cylinder gas amount Gact that has been calculated, an EGR ratio REGRT (%), which is a ratio of the sum of the internal EGR amount and the external EGR amount with respect to the total in-cylinder gas amount, is calculated by the following equation (15).
[MATH. 15]

Figure 5:
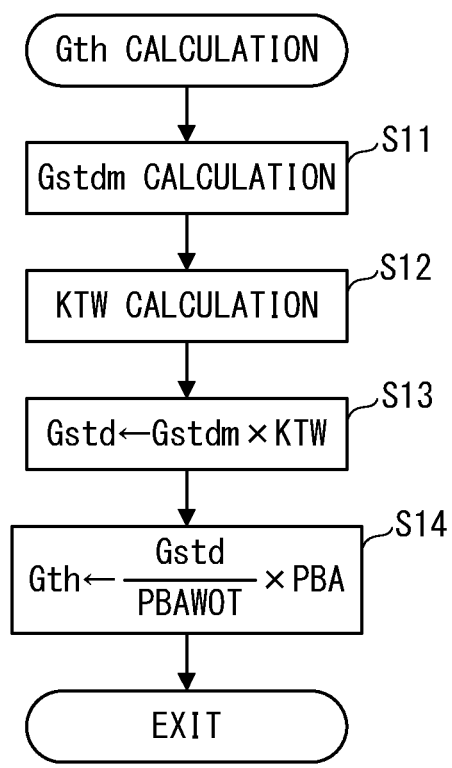
FIG. 5 is a flowchart illustrating a calculation process of an ideal in-cylinder gas amount Gth.
Figure 6:
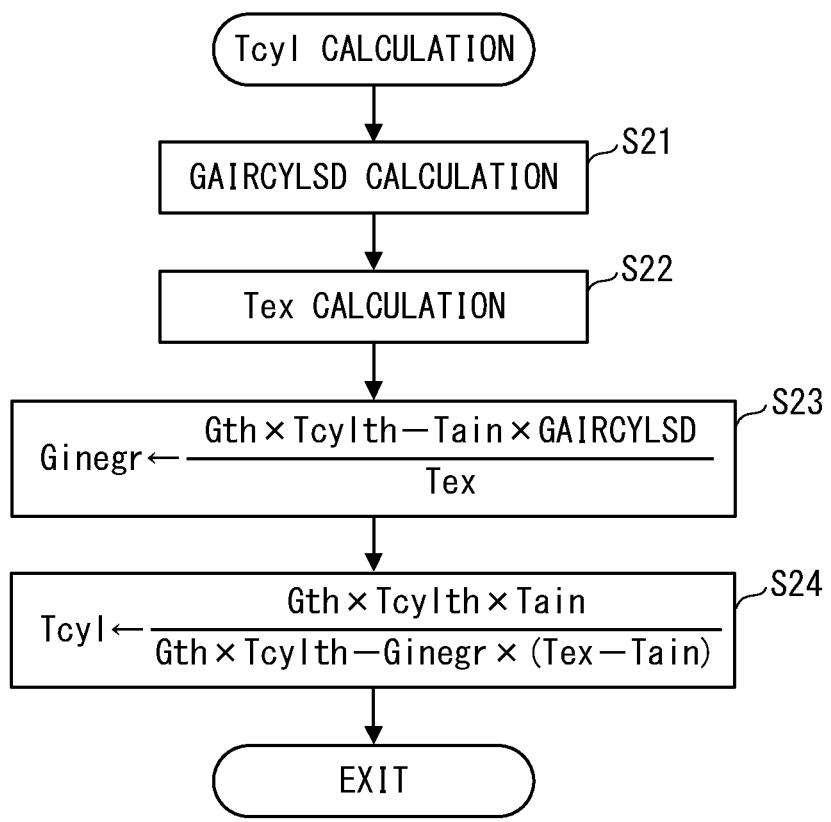
FIG. 6 is a flowchart illustrating a calculation process of an in-cylinder gas temperature Tcyl.
Figure 7:
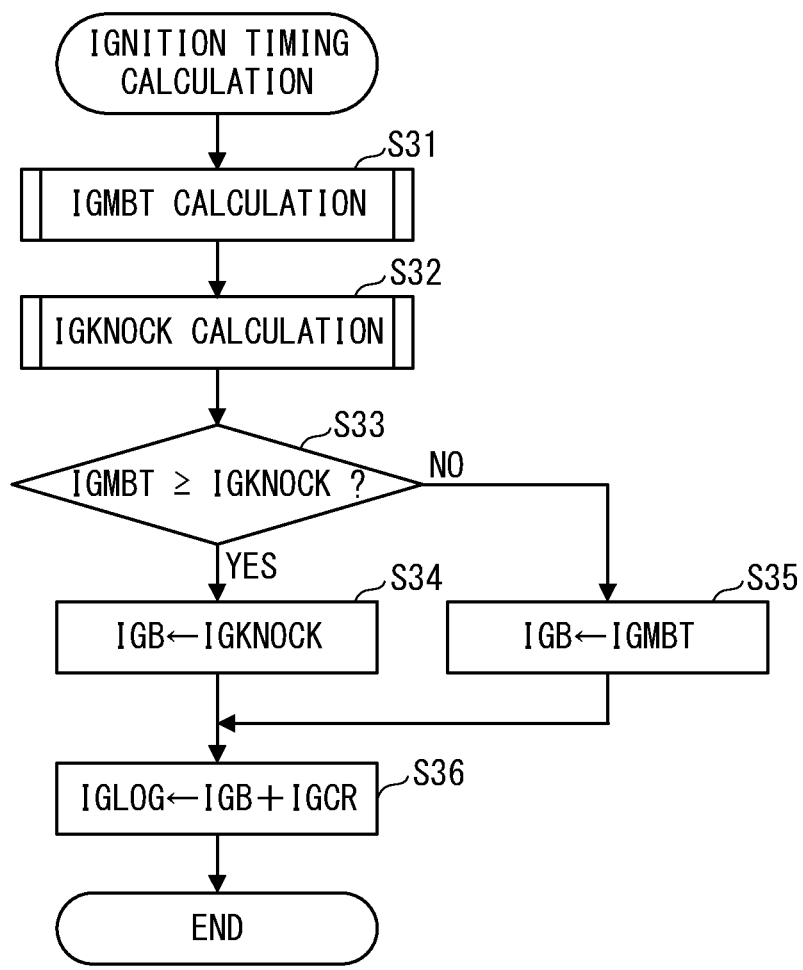
FIG. 7 is a flowchart illustrating a calculation process of an ignition timing IGLOG.

Next, an EGR ratio calculation process of calculating the EGR ratio REGRT using the in-cylinder gas temperature Tcyl, the in-cylinder gas amount Gact, and the like will be described with reference to FIGS. 4 to 6. The present process is performed by the ECU 2 in synchronization with the generation of the TDC signal.

Figure 4:
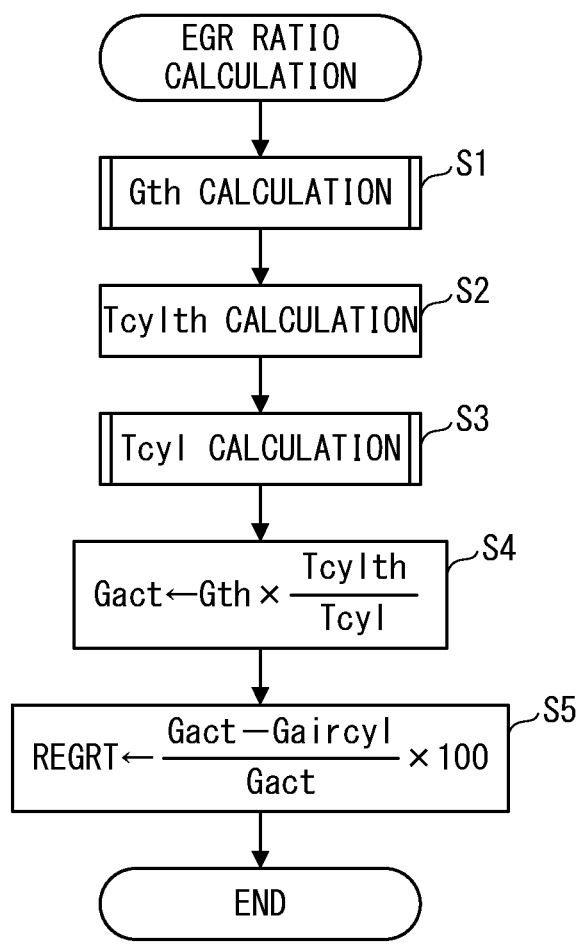
FIG. 4 is a flowchart illustrating a calculation process of an EGR ratio REGRT.

In the present process, in step 1 (indicated by "S1", and the same applies to the following description) of FIG. 4, the ideal in-cylinder gas amount Gth is calculated. FIG. 5 illustrates a calculation process thereof. In this calculation process, first, in step 11, a map value Gstdm of the reference in-cylinder gas amount Gstd (an in-cylinder gas amount at the reference point PWOT in FIG. 3) is calculated. The calculation is carried out, for example, by searching a predetermined reference in-cylinder gas amount map (not illustrated) in accordance with the magnitude of the valve lift of the intake valve by the valve lift variable mechanism, the engine speed NE that has been detected, the intake phase CAIN, and the exhaust phase CAEX.

Regarding this reference in-cylinder gas amount map, in a reference state in which the throttle valve 7 is fully opened, relationships among the above-described four parameters and the in-cylinder gas amount are obtained beforehand by experiments or the like, and the in-cylinder gas amount that has been obtained is stored as the map value Gstdm of the reference in-cylinder gas amount.

Next, by searching a predetermined temperature correction coefficient map (not illustrated) in accordance with the engine water temperature TW that has been detected, a temperature correction coefficient KTW is calculated (step 12). Next, by multiplying the temperature correction coefficient KTW by the map value Gstdm calculated in step 11, the temperature of the map value Gstdm is corrected and the reference in-cylinder gas amount Gstd is calculated (step 13).

Then, in step 14, using the reference in-cylinder gas amount Gstd and the reference intake air pressure PBAWOT, by multiplying Gstd/PBAWOT corresponding to the inclination of the ideal line Lth by the intake air pressure PBA that has been detected, the ideal in-cylinder gas amount Gth is calculated.

Returning to FIG. 4, in step 2 subsequent to step 1, an ideal in-cylinder gas temperature Tcylth is calculated. The calculation is carried out, for example, by searching a predetermined ideal in-cylinder gas temperature map (not illustrated) in accordance with the magnitude of the valve lift of the intake valve, the engine speed NE, the intake phase CAIN, and the exhaust phase CAEX. In such an ideal in-cylinder gas temperature map, in a reference state in which the throttle valve 7 is fully opened, relationships among the above four parameters and the in-cylinder gas temperature are obtained beforehand by experiments or the like, and the in-cylinder gas temperature that has been obtained is stored as the ideal in-cylinder gas temperature Tcylth.

Next, the in-cylinder gas temperature Tcyl is calculated (step 3). FIG. 6 illustrates a calculation process thereof. In this calculation process, first, in step 21, an SD-method intake air amount GAIRCYLSD is calculated. The calculation is carried out, for example, by searching a predetermined SD-method intake air amount map (not illustrated) in accordance with the engine speed NE that has been detected, the intake air pressure PBA, the intake phase CAIN, and the exhaust phase CAEX. In the SD-method intake air amount map, in a state in which the external EGR is not introduced, the relationships among the above four parameters and the intake air amount are obtained beforehand by experiments or the like, and the intake air amount that has been obtained is stored as the SD-method intake air amount GAIRCYLSD.

Next, the exhaust gas temperature Tex is calculated (step 22). The calculation is carried out, for example, by searching a predetermined exhaust gas temperature map (not illustrated) in accordance with the magnitude of the valve lift of the intake valve, the engine speed NE, the intake air amount Gaircyl, and the like. In such an exhaust gas temperature map, the exhaust gas temperature Tex is set to increase, as the engine speed NE increases and as the intake air amount Gaircyl increases.

Next, by applying the ideal in-cylinder gas amount Gth and the ideal in-cylinder gas temperature Tcylth calculated in steps 1 and 2, the intake manifold gas temperature Tain that has been detected, and the SD-method intake air amount GAIRCYLSD and the exhaust gas temperature Tex calculated in steps 21 and 22 to the above equation (5), the internal EGR amount Ginegr is calculated (step 23).

Next, together with the ideal in-cylinder gas amount Gth, the ideal in-cylinder gas temperature Tcylth, the intake manifold gas temperature Tain, and the exhaust gas temperature Tex, by applying the internal EGR amount Ginegr that has been calculated to the above equation (13), the in-cylinder gas temperature Tcyl is calculated (step 24), and the present process ends.

Returning to FIG. 4, in step 4 subsequent to the above step 3, by applying the ideal in-cylinder gas amount Gth, the ideal in-cylinder gas temperature Tcylth, and the in-cylinder gas temperature Tcyl respectively calculated in steps 1 to 3 to the above equation (14), the actual in-cylinder gas amount Gact is calculated.

Then, in step 5, by applying the in-cylinder gas amount Gact that has been calculated and the intake air amount Gaircyl to the above equation (15), the EGR ratio REGRT is calculated, and the present process ends.

Next, an ignition timing calculation process performed by the ECU 2 will be described with reference to FIGS. 7 to 13. The ignition timing is represented with a compression top dead center as a reference and an advanced angle side as a positive value. The present process is performed in synchronization with generation of the TDC signal.

Figure 14:
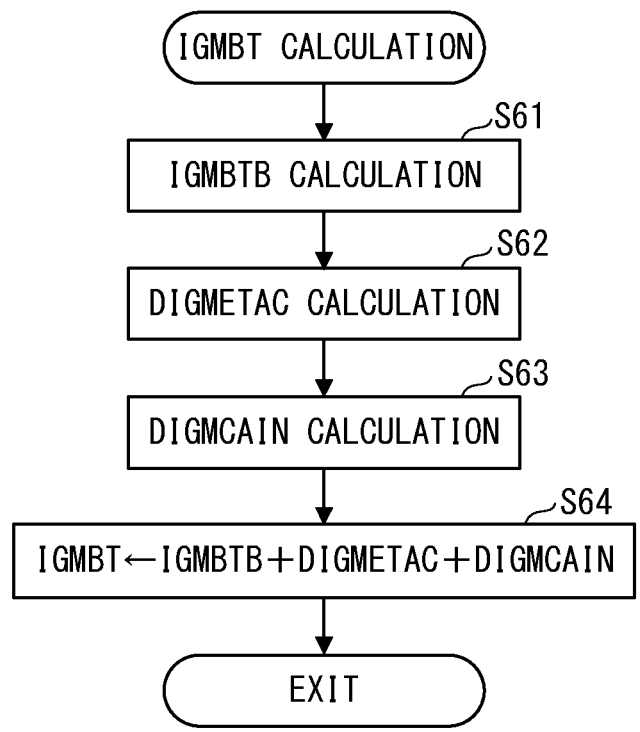
FIG. 14 is a flowchart illustrating a calculation process of the optimum ignition timing IGMBT.

In the present process, first, in step 31, an optimum ignition timing IGMBT (an ignition timing at which output torque of the engine 1 is maximized) is calculated. FIG. 14 illustrates a calculation process thereof. In this calculation process, first, in step 61, by searching an IGMBTB map illustrated in FIG. 10 in accordance with the engine speed NE and the EGR ratio REGRT that has been calculated as described above, a basic value IGMBTB of the optimum ignition timing is calculated. As the EGR ratio REGRT increases, the ignition delay increases and the combustion speed decreases. Thus, the optimum ignition timing shifts to a more advanced angle side. From this relationship, in the IGMBTB map, the basic value IGMBTB at the optimum ignition timing is set to increase (to the advanced angle side), as the EGR ratio REGRT increases.

Next, in step 62, by searching a predetermined DIGMETAC map (not illustrated) in accordance with the engine speed NE and filling efficiency ETAC, a filling efficiency correction amount DIGMETAC is calculated. As the filling efficiency ETAC increases, the oxygen amount in the cylinder increases and the ignition delay decreases. Thus, the optimum ignition timing shifts to a more retarded angle side. From this relationship, in the DIGMETAC map, the filling efficiency correction amount DIGMETAC is set to decrease (retarded angle side), as the EGR ratio REGRT increases.

Next, in step 63, by searching a predetermined DIGMCAIN map (not illustrated) in accordance with the engine speed NE and the intake phase CAIN, the valve timing correction amount DIGMCAIN is calculated. When the intake phase CAIN changes, the in-cylinder flow (the flow of the mixed gas in the cylinder) changes. The combustion speed changes accordingly, and thus influences the optimum ignition timing. In the DIGMCAIN map, the valve timing correction amount DIGMCAIN is set so as to reflect such an influence.

Then, in step 64, by applying the basic value IGMBTB, the filling efficiency correction amount DIGMETAC, and the valve timing correction amount DIGMCAIN respectively calculated in steps 61 to 63 to the following equation (16), the optimum ignition timing IGMBT is calculated, and the present process ends.

[MATH. 16]

Figure 8:
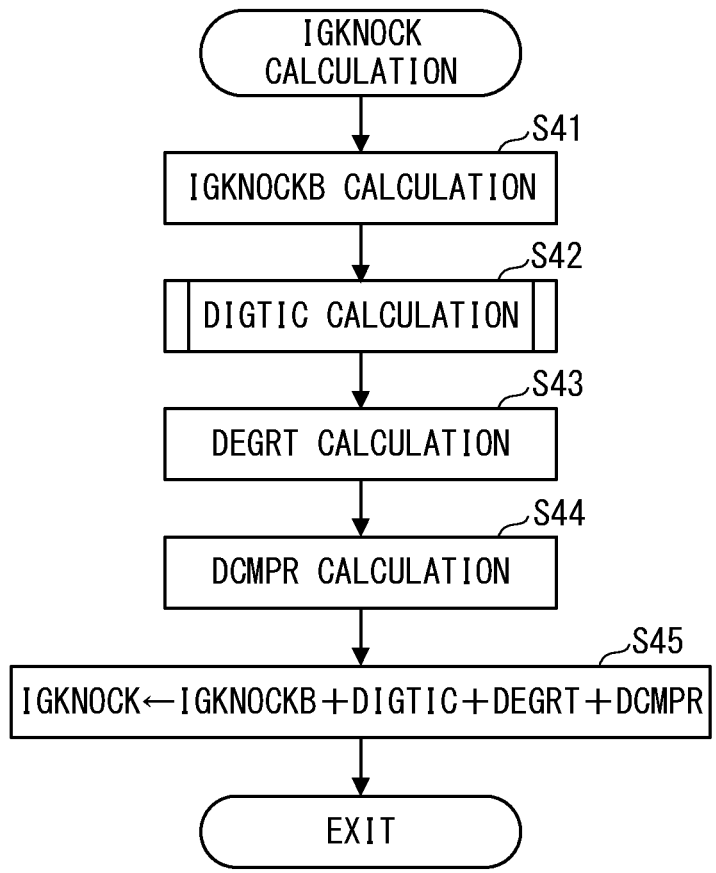
FIG. 8 is a flowchart illustrating a calculation process of a knock limit ignition timing IGKNOCK.

Returning to FIG. 7, in step 32 subsequent to step 31, a knock limit ignition timing IGKNOCK corresponding to an occurrence limit of knocking in the engine 1 is calculated. FIG. 8 illustrates a calculation process thereof. In this calculation process, first, in step 41, by searching a predetermined IGKNOCKB map (not illustrated) in accordance with the engine speed NE and the intake air amount Gaircyl, the basic value IGKNOCKB of the knock limit ignition timing IGKNOCK is calculated. In such an IGKNOCKB map, the basic value IGKNOCKB is set to correspond to the optimum ignition timing in a case where the EGR ratio REGRT is set to a predetermined reference value and the intake phase CAIN and the exhaust phase CAEX are each set to a reference phase (for example, a most retarded angle phase and a most advanced angle phase).

Figure 9:
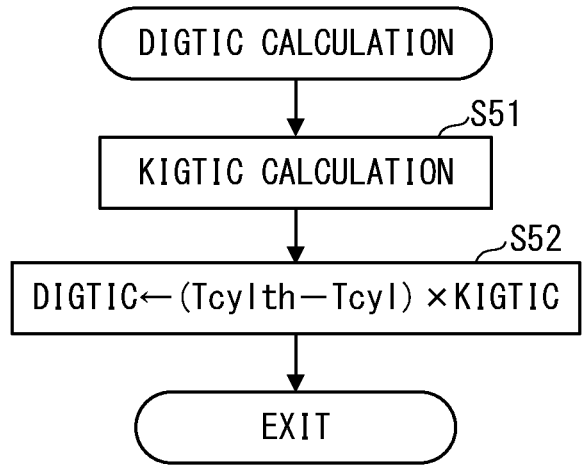
FIG. 9 is a flowchart illustrating a calculation process of a temperature knocking correction amount DIGTIC.
Figure 10:
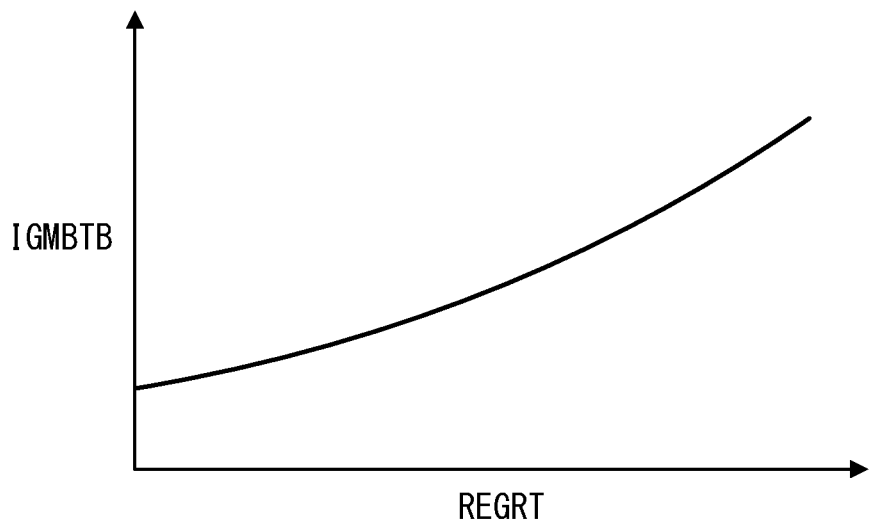
FIG. 10 is a map illustrating a relationship between the EGR ratio REGRT and an optimum ignition timing IGMBT.
Figure 11:
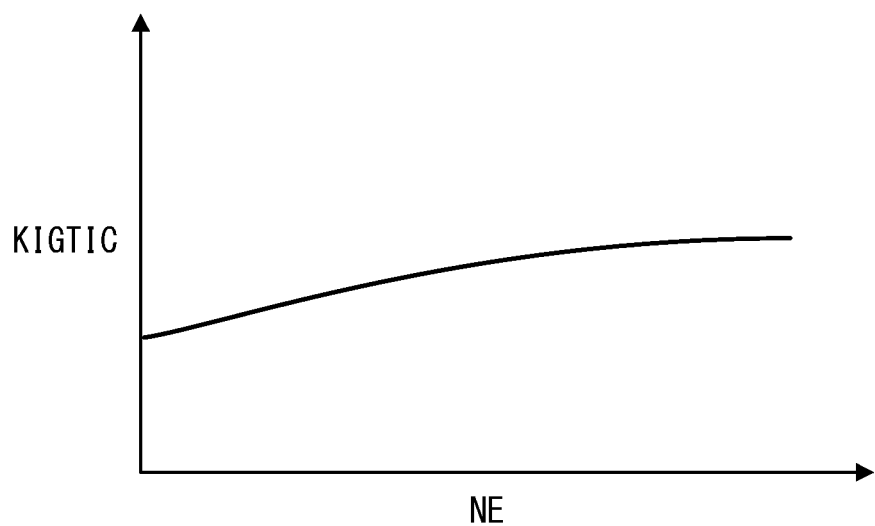
FIG. 11 is a map illustrating a relationship between an engine speed NE and a correction coefficient KIGTIC.

Next, in step 42, a temperature knocking correction amount DIGTIC is calculated. FIG. 9 illustrates a calculation process thereof. In this calculation process, first, in step 51, by searching a KIGTIC map illustrated in FIG. 11 in accordance with the magnitude of the valve lift of the intake valve and the engine speed NE, a correction coefficient KIGTIC is calculated. In such a KIGTIC map, the correction coefficient KIGTIC is set to gradually increase, as the engine speed NE increases.

Next, by applying the ideal in-cylinder gas temperature Tcylth and the in-cylinder gas temperature Tcyl respectively calculated in steps 2 and 3 and the correction coefficient KIGTIC to the following equation (17), the temperature knocking correction amount DIGTIC is calculated (step 52), and the present process ends.

[MATH. 17]

As is apparent from the above calculation method, the temperature knocking correction amount DIGTIC is set to decrease, that is, is set on a retarded angle side, as the in-cylinder gas temperature Tcyl is relatively higher than the ideal in-cylinder gas temperature Tcylth.

Figure 12:
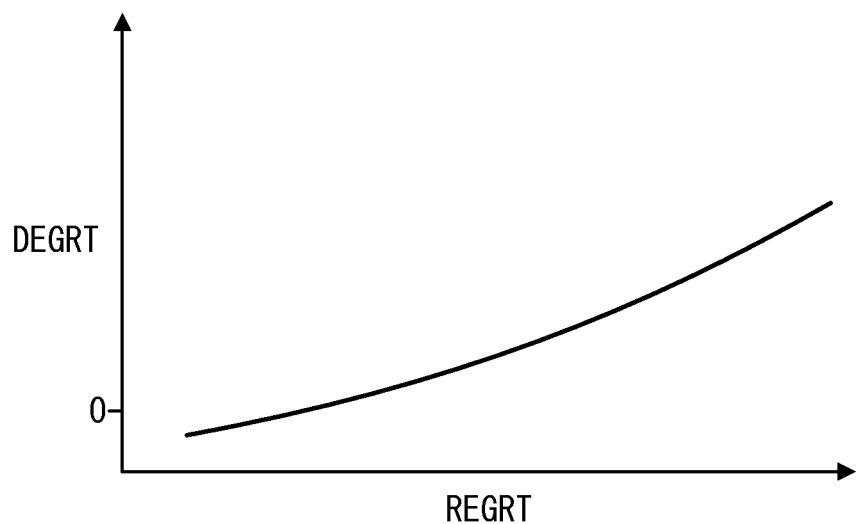
FIG. 12 is a map illustrating a relationship between the EGR ratio REGRT and an EGR knocking correction amount DEGRT.

Returning to FIG. 8, in step 43 subsequent to step 42, by searching a DEGRT map illustrated in FIG. 12 in accordance with the EGR ratio REGRT and the engine speed NE, an EGR knocking correction amount DEGRT is calculated. In such a DEGRT map, the EGR knocking correction amount DEGRT is set to increase, that is, is set on an advanced angle side, as the EGR ratio REGRT increases.

Figure 13:
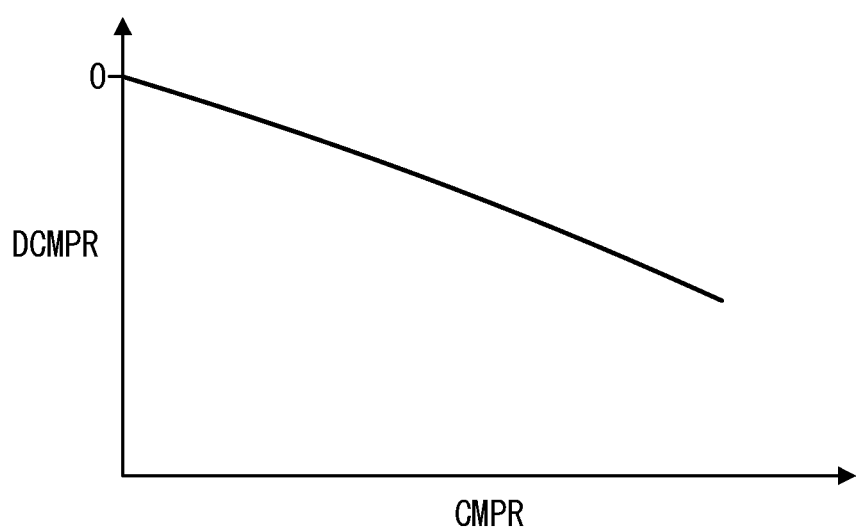
FIG. 13 is a map illustrating a relationship between an effective compression ratio CMPR and a compression ratio knocking correction amount DCMPR.

Next, in step 44, a compression ratio knocking correction amount DCMPR is calculated. Regarding the compression ratio knocking correction amount DCMPR, first, by searching a predetermined CMPR table (not illustrated) in accordance with the intake phase CAIN and the exhaust phase CAEX, an effective compression ratio CMPR is calculated. In such a CMPR table, the effective compression ratio CMPR is set to increase, as an advanced angle amount of the intake phase CAIN increases. Then, by searching a DCMPR map illustrated in FIG. 13 in accordance with the effective compression ratio CMPR that has been calculated and the engine speed NE, the compression ratio knocking correction amount DCMPR is calculated. As illustrated in FIG. 13, in the DCMPR map, the compression ratio knocking correction amount DCMPR takes a value equal to or smaller than "0", and is set to decrease, that is, is set on the retarded angle side, as the effective compression ratio CMPR increases.

Then, in step 45, by applying the basic value IGKNOCKB, the temperature knocking correction amount DIGTIC, the EGR knocking correction amount DEGRT, and the effective compression ratio correction amount DCMPR respectively calculated in steps 41 to 44 to the following equation (18), the knock limit ignition timing IGKNOCK is calculated, and the present process ends.

[MATH. 18]

Returning to FIG. 7, in step 33 subsequent to step 32, it is determined whether the optimum ignition timing IGMBT is equal to or greater than the knock limit ignition timing IGKNOCK. In a case where such a determination result is YES and the optimum ignition timing IGMBT is calculated to be identical to or on an advanced angle side with respect to the knock limit ignition timing IGKNOCK, the basic ignition timing IGB is set to the knock limit ignition timing in order to avoid an occurrence of knocking (step 34). On the other hand, in a case where the determination result in step 33 is NO and the optimum ignition timing IGMBT is calculated on a retarded angle side with respect to the knock limit ignition timing IGKNOCK, the basic ignition timing IGB is set to the optimum ignition timing IGMBT in order to obtain a maximum output of the engine 1, while avoiding the occurrence of knocking (step 35).

Then, by adding, for example, a correction value IGCR that has been calculated in accordance with an engine cooling water temperature TW to the basic ignition timing IGB that has been set in the above step 34 or 35, the ignition timing IGLOG is calculated (step 36), and the present process ends. Ignition with the ignition plug 15 is conducted, based on the ignition timing IGLOG that has been calculated as described above.

Figure 15:
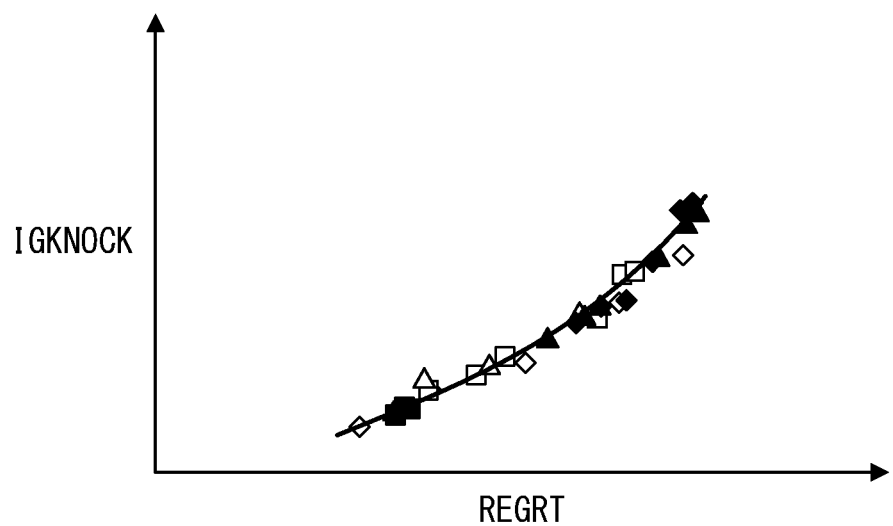
FIG. 15 is a diagram illustrating a relationship between the EGR ratio REGRT and the knock limit ignition timing IGKNOCK obtained according to an embodiment.

FIG. 15 illustrates a relationship between the EGR ratio REGRT and the knock limit ignition timing IGKNOCK that have been obtained by the above-described ignition timing calculation process. More specifically, the knock limit ignition timing IGKNOCK that has been corrected using the in-cylinder gas temperature Tcyl and the EGR ratio REGRT is plotted in relation to the EGR ratio REGRT for each of six different combinations (indicated by six different codes) of the intake phase CAIN and the exhaust phase CAEX. As is apparent from the drawing, it has been confirmed that the knock limit ignition timing IGKNOCK has a high correlation with the EGR ratio REGRT without depending on the intake phase CAIN or the exhaust phase CAEX.

Figure 16:
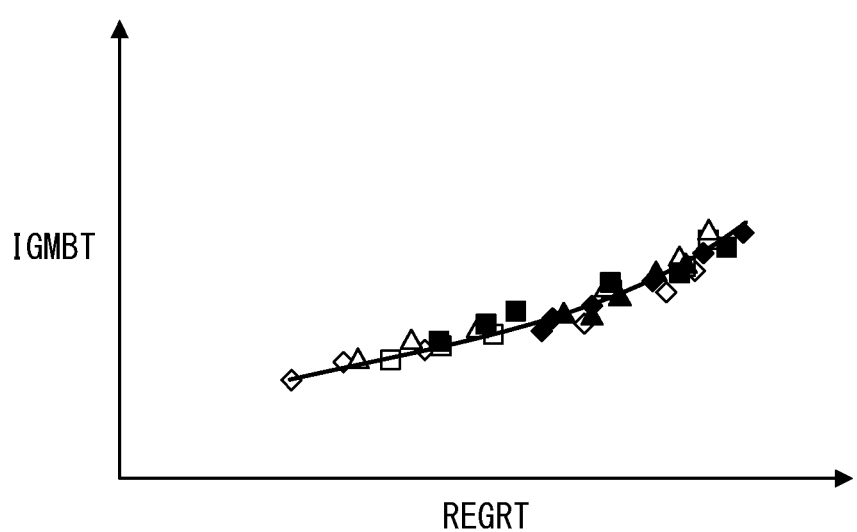
FIG. 16 is a diagram illustrating a relationship between the EGR ratio REGRT and the optimum ignition timing IGMBT obtained according to an embodiment.

FIG. 16 illustrates a relationship between the EGR ratio REGRT and the optimum ignition timing IGMBT that have been obtained by the above-described calculation process of the ignition timing. More specifically, the optimum ignition timing IGMBT that has been calculated using the EGR ratio REGRT is plotted in relation to the EGR ratio REGRT for each of six different combinations (indicated by six different codes) of the intake phase CAIN and the exhaust phase CAEX similar to the case of FIG. 15. As is apparent from the drawing, it has been confirmed that the optimum ignition timing IGMBT also has a high correlation with the EGR ratio REGRT without depending on the intake phase CAIN or the exhaust phase CAEX, similarly to the knock limit ignition timing IGKNOCK that has been described above.

As described heretofore, according to the present embodiment, the amount of the mixed gas of the intake air and the external EGR gas present on the downstream side of the throttle valve 7 of the intake pipe 4 is calculated as the SD-method intake air amount GAIRCYLSD, and the temperature of the mixed gas is detected as the intake manifold gas temperature Tain. In addition, the in-cylinder gas temperature Tcyl, the in-cylinder gas amount Gact, the EGR ratio REGRT, and the like are sequentially calculated using the SD-method intake air amount GAIRCYLSD and the intake manifold gas temperature Tain that have been obtained. Accordingly, in a case where the external EGR is conducted together with the internal EGR, it is possible to accurately calculate the in-cylinder gas temperature Tcyl, the in-cylinder gas amount Gact, and the EGR ratio REGRT, while suppressing an influence of the transport delay of the external EGR. In addition, it is possible to appropriately calculate the knock limit ignition timing IGKNOCK and the optimum ignition timing IGMBT using the EGR ratio REGRT that has been calculated, and to appropriately control the ignition timing IGLOG.

Note that the present invention is not limited to the embodiments that have been described, but is enabled according to various aspects. For example, the engine in an embodiment is of a natural intake type that does not supercharge. However, the present invention is not limited to this. The present invention is also applicable to an engine of supercharging type.

Figure 17:
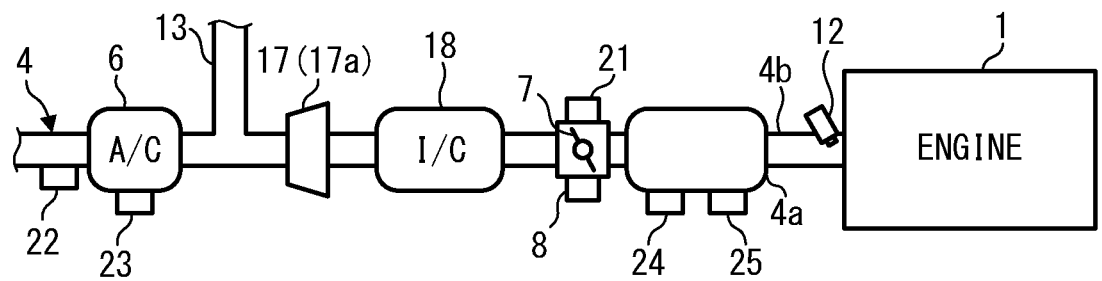
FIG. 17 is a diagram schematically illustrating a part of the internal combustion engine, which is a different type from that of FIG. 1, and to which the present invention is applied.

FIG. 17 illustrates an example of such an engine of supercharging type. In this engine, a compressor 17a of a turbocharger 17 and an intercooler 18 are provided sequentially from an upstream side between an air cleaner 6 and the throttle valve 7 of the intake pipe 4, and the EGR pipe 13 is connected with an immediate upstream side of the compressor 17a. In addition, similarly to the engine of FIG. 1, the intake air pressure sensor 24 and the intake manifold temperature sensor 25 are disposed in the intake chamber 4a on a downstream side of the throttle valve 7. Other configurations are the same as those of the engine of FIG. 1.

Then, similarly to the case of the engine of FIG. 1, the SD-method intake air amount GAIRCYLSD is calculated as the mixed gas amount of the intake air and the external EGR gas, based on the intake air pressure PBA that has been detected by the intake air pressure sensor 24 and the engine speed NE, and the intake manifold temperature sensor 25 detects the intake manifold gas temperature Tain as a mixed gas temperature. In addition, the in-cylinder gas temperature Tcyl, the in-cylinder gas amount Gact, the EGR ratio REGRT, and the like are sequentially calculated using the SD-method intake air amount GAIRCYLSD and the intake manifold gas temperature Tain. Accordingly, an effect similar to that in the case of the engine of FIG. 1 is obtainable.

Further, in an embodiment, an example of controlling the ignition timing IGLOG using the EGR ratio REGRT has been described. However, the present invention is not limited this. The present invention can also be used for another type of control of the engine 1.

Further, an embodiment is an example of applying the present invention to a gasoline engine for a vehicle, but is also applicable to other engines as long as the internal EGR and the external EGR are conducted, and is also applicable to an engine for another application, for example, an engine for a marine vessel, such as an outboard motor in which a crankshaft is disposed in a vertical direction. In addition, configurations of the details are appropriately changeable within the scope of the present invention.

What is claimed is:

1. A control device for an internal combustion engine, which sucks air into a cylinder through a throttle valve provided in an intake passage, and in which internal EGR and external EGR are conducted, the internal EGR recirculating exhaust gas of the internal combustion engine into the cylinder as internal EGR gas, the exhaust gas having flown back from an exhaust passage side to an intake passage side due to an overlap between an intake valve and an exhaust valve, the external EGR partially recirculating the exhaust gas to the intake passage as external EGR gas, the exhaust gas having been discharged from the cylinder to the exhaust passage, the control device comprising:
    an ideal in-cylinder gas amount calculation unit configured to calculate, as an ideal in-cylinder gas amount, an in-cylinder gas amount charged in the cylinder in an ideal state in which it is assumed that neither the internal EGR gas nor the external EGR gas recirculates into the cylinder;
    an ideal in-cylinder gas temperature calculation unit configured to calculate, as an ideal in-cylinder gas temperature, an in-cylinder gas temperature in the ideal state;
    a rotation speed detection unit configured to detect a rotation speed of the internal combustion engine;
    an intake air pressure detection unit configured to detect, as intake air pressure, pressure on a downstream side of the throttle valve in the intake passage;
    a mixed gas amount calculation unit configured to calculate a mixed gas amount of intake air and the external EGR gas present on the downstream side of the throttle valve of the intake passage and charged in the cylinder, based on the rotation speed of the internal combustion engine and the intake air pressure;
    a mixed gas temperature detection unit configured to detect a mixed gas temperature;
    an internal EGR temperature acquisition unit configured to acquire an internal EGR temperature;
    an internal EGR amount calculation unit configured to calculate an internal EGR amount, based on the ideal in-cylinder gas amount, the ideal in-cylinder gas temperature, the mixed gas amount, the mixed gas temperature, and the internal EGR temperature;
    an in-cylinder gas temperature calculation unit configured to calculate a temperature of an in-cylinder gas actually charged in the cylinder, based on the ideal in-cylinder gas amount, the ideal in-cylinder gas temperature, the mixed gas temperature, the internal EGR temperature, and the internal EGR amount;
    an in-cylinder gas amount calculation unit configured to calculate an in-cylinder gas amount, based on the ideal in-cylinder gas amount, the ideal in-cylinder gas temperature, and the in-cylinder gas temperature;
    an intake air amount detection unit configured to detect an intake air amount to be sucked into the cylinder;
    an EGR ratio calculation unit configured to calculate an EGR ratio that is a ratio of an EGR amount obtained by combining the internal EGR amount and the external EGR amount with respect to the in-cylinder gas amount, based on the in-cylinder gas amount and the intake air amount; and
    a control unit configured to control the internal combustion engine, based on the EGR ratio.

2. The control device for the internal combustion engine according to claim 1, wherein
    the internal combustion engine includes a valve operation characteristic variable device configured to change operation phases of the intake valve and the exhaust valve to change the internal EGR amount,
    the control device further comprising:
    a storage unit configured to store a relationship among the rotation speed of the internal combustion engine, the operation phases of the intake valve and the exhaust valve, the ideal in-cylinder gas amount, and the ideal in-cylinder gas temperature; and
    an operation phase acquisition unit configured to acquire the operation phases of the intake valve and the exhaust valve, and wherein
    the ideal in-cylinder gas amount calculation unit calculates the ideal in-cylinder gas amount and the ideal in-cylinder gas temperature calculation unit calculates the ideal in-cylinder gas temperature, based on the relationship that has been stored in the storage unit, in accordance with the rotation speed of the internal combustion engine that has been detected and the operation phases of the intake valve and the exhaust valve that have been acquired.

3. The control device for the internal combustion engine according to claim 1,
    the control unit further comprising:
    a basic value calculation unit configured to calculate a basic value of a knock limit ignition timing corresponding to an occurrence limit of knocking in the internal combustion engine;
    an EGR knocking correction amount calculation unit configured to calculate an EGR knocking correction amount in accordance with the EGR ratio;
    a temperature knocking correction amount calculation unit configured to calculate a temperature knocking correction amount in accordance with a difference between the ideal in-cylinder gas temperature and the in-cylinder gas temperature; and
    a knock limit ignition timing calculation unit configured to correct the basic value by using the EGR knocking correction amount and the temperature knocking correction amount to calculate the knock limit ignition timing, wherein
    the control unit controls an ignition timing by using the knock limit ignition timing.

4. The control device for the internal combustion engine according to claim 3,
    the control unit further comprising an optimum ignition timing calculation unit configured to calculate an optimum ignition timing at which an output of the internal combustion engine is maximized in accordance with the EGR ratio, wherein the control unit controls the ignition timing by using the ignition timing on a retarded angle side of either the knock limit ignition timing or the optimum ignition timing.

* * * * *